United States Patent [19]
Hoeft

[11] Patent Number: 6,055,057
[45] Date of Patent: Apr. 25, 2000

[54] METHOD AND APPARATUS FOR ACCURATELY SENSING A LIGHT BEAM AS IT PASSES A DEFINED POINT

[75] Inventor: Jon L. Hoeft, Honeoye Falls, N.Y.

[73] Assignee: Eastman Kodak Company, Rochester, N.Y.

[21] Appl. No.: 09/218,868

[22] Filed: Dec. 22, 1998

[51] Int. Cl.[7] .................................................. G01B 11/28
[52] U.S. Cl. .......................................... 356/380; 356/380
[58] Field of Search .................................... 356/213, 435, 356/380

[56] References Cited

U.S. PATENT DOCUMENTS

| | | |
|---|---|---|
| 4,306,807 | 12/1981 | Sakane et al. . |
| 4,492,858 | 1/1985 | Mizokami . |
| 4,681,441 | 7/1987 | Uchidoi et al. . |
| 4,939,739 | 7/1990 | Hobart et al. . |
| 5,033,061 | 7/1991 | Hobart et al. . |
| 5,307,198 | 4/1994 | Sullivan . |
| 5,594,556 | 1/1997 | Vronsky et al. . |
| 5,615,038 | 3/1997 | Suzuki et al. . |
| 5,748,303 | 5/1998 | Korta et al. . |
| 5,751,747 | 5/1998 | Lutes et al. . |
| 5,778,017 | 7/1998 | Sato et al. . |

Primary Examiner—Frank G. Font
Assistant Examiner—Reginald A. Ratliff
Attorney, Agent, or Firm—Frank Pincelli

[57] ABSTRACT

A method and apparatus for detecting a scanning light beam used for writing onto a media. A detector is disposed in the scanning path for sending a signal to a first amplifier. A second amplifier is provided for providing a feed back loop to the first amplifier so as to maintain the first amplifier a predetermined level. A time delay circuit provided between the output of the second amplifier and first amplifier for delaying the signal from said second amplifier to said positive input of said first amplifier such that the output of the first amplifier is forced to a predetermined value when no signal is being produced by the detector.

10 Claims, 5 Drawing Sheets

METHOD AND APPARATUS FOR ACCURATELY SENSING A LIGHT BEAM AS IT PASSES A DEFINED POINT

FIELD OF THE INVENTION

The present invention is directed to a writing apparatus, which uses a scanning light beam for writing onto a media.

BACKGROUND OF THE INVENTION

When a scanning light beam, such as a laser beam, is used to create an image on a media, such as a photographic paper, film, or other photosensitive media, it is of utmost importance to locate the starting point for each scan line as precisely as possible. If successive scan line starts differ by too great an amount, the vertical details of the image would be lost. In other words, a vertical line in the image would appear wavy or jagged. The amount of precision required for this type system was established empirically at ±10 nSec. Current detection systems have a precision of ±50 nSec. In prior art devices, a photodiode is typically used for detecting the beam and for calculating the light start of the scanning light beam. A problem associated with typical circuits that are used for controlling the photodiode is that some dark current is always present. With high gain transimpedance amplifiers, this can lead to large amounts of dc offset in the output, which can cause the detector to be triggered at the wrong time. This dc offset is normally compensated for by including an offset nulling adjustment to one of the inputs of the transimpedance amplifier. However, this is a manual and very tedious adjustment. Additionally, it is subject to exactly how much ambient light is hitting the detector, how much patience the operator has, and how much gain is in the transimpedance amplifier.

The present invention provides a circuit whereby the problems of the prior art are minimized and/or eliminated.

SUMMARY OF THE INVENTION

The present invention is directed to overcoming one or more of the problems set forth above. Briefly summarized according to one aspect of the present invention there is provided a scanning apparatus having a scanning light beam which moves along a scan path for writing onto a media, comprising:

a detector disposed in the scan path;

a first amplifier having a negative input, a positive input and an output, the output of the detector being connected to the negative input of the first amplifier;

a second amplifier having a negative input, a positive input and an output, the output of the second amplifier being connected to the positive input of the first amplifier; and a time delay circuit provided between the output of the second amplifier and the positive input of the first amplifier for delaying the signal from the second amplifier to the positive input of the first amplifier.

In accordance with another aspect of the present invention, there is provided a method for monitoring when a scanning light beam crosses a predetermined point in a scan path, the monitoring circuit comprising a detector placed in the path of the scanning beam at a predetermined point and an amplifier having a negative input, a positive input and an output, the output of the diode being connected to the negative input, comprising the step of:

providing a feedback loop to the amplifier, such that the output of the amplifier is forced to a predetermined value when no signal is being produced by the detector.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
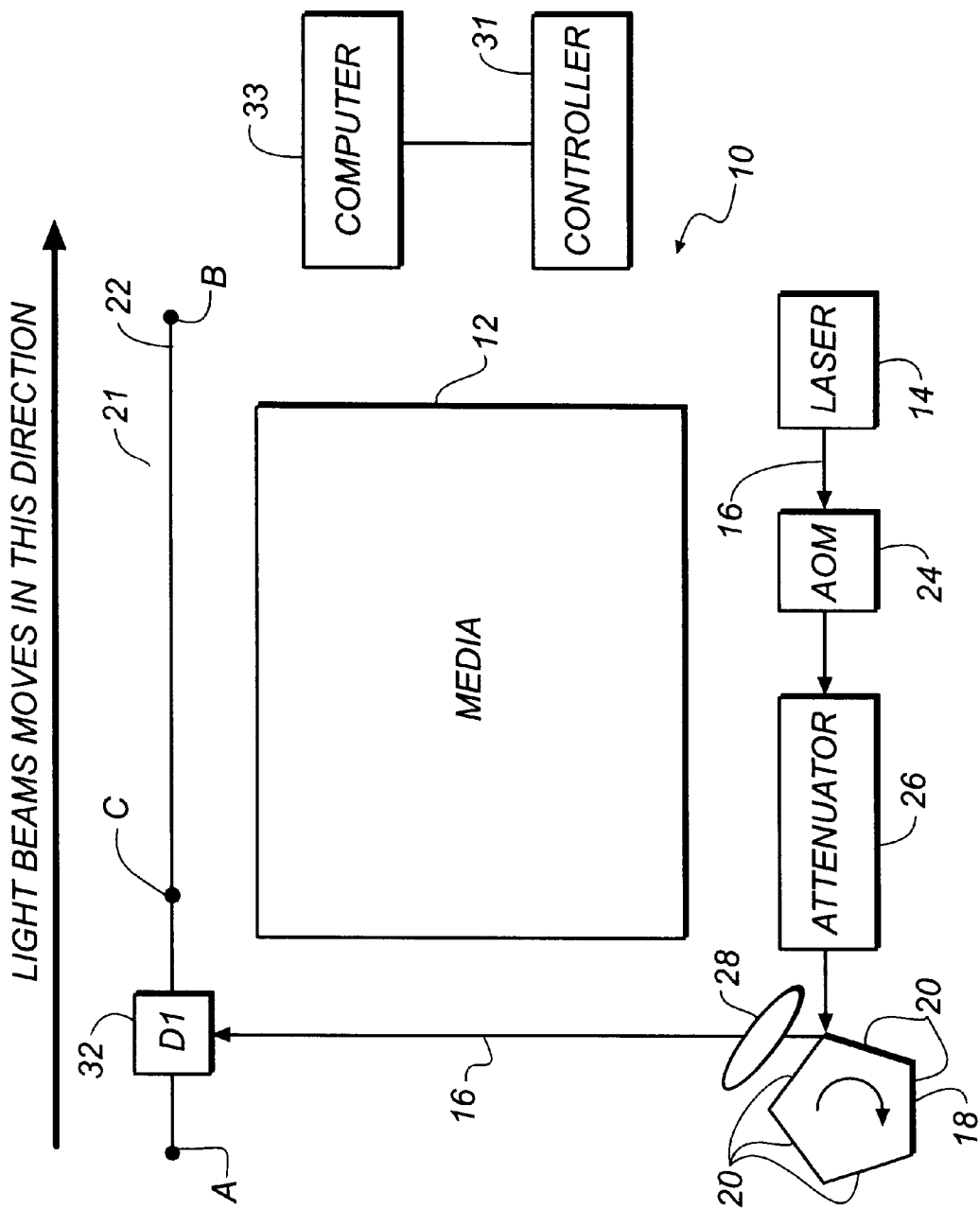
FIG. 1 is a schematic illustration of a scanning writing apparatus made in accordance with the present invention.

Referring to FIG. 1, there is illustrated a digital scanning apparatus 10 made in accordance with the present invention. The scanning apparatus is designed for producing an image onto a media 12 by using a scanning light source. In the particular embodiment illustrated, a laser 14 is provided for producing a light beam 16, which is directed to a rotating polygon 18 having a plurality of mirror facets 20. The facets reflect the laser light beam 16 onto a writing plane 21 along scan (writing) path 22, having a starting point A and an ending point B. The light beam 16 from laser 14 is passed through an acoustic optical modulator (AOM) 24 and attenuator 26 for providing appropriate adjustment and digital image data thereon for writing onto media 12 as is typically done in prior art digital writing devices. In the particular embodiment illustrated, photosensitive media 12 is photographic paper. However, it is to be understood that the photosensitive media 12 may be any other type of photosensitive media, for example, but not by way of limitation, photographic film, thermal paper, and other photosensitive media and/or surface. An f-θ lens 28 is provided for properly focusing and directing of the beam onto the writing plane 21. A detector 32 is provided for determining line start. In the particular embodiment illustrated, the detector 32 is a photodiode detector as is typically used in prior art devices. A controller 31 having appropriate circuit boards in conjunction with a computer 33 is provided for controlling operation of 10 as is customarily done in such devices. Appropriate media moving mechanisms, not shown, is provided for moving of media 12 past scan path 22 in the direction indicated by arrow 35, such that successive lines of data may be written onto the media as is customarily done in such devices.

Figure 2:
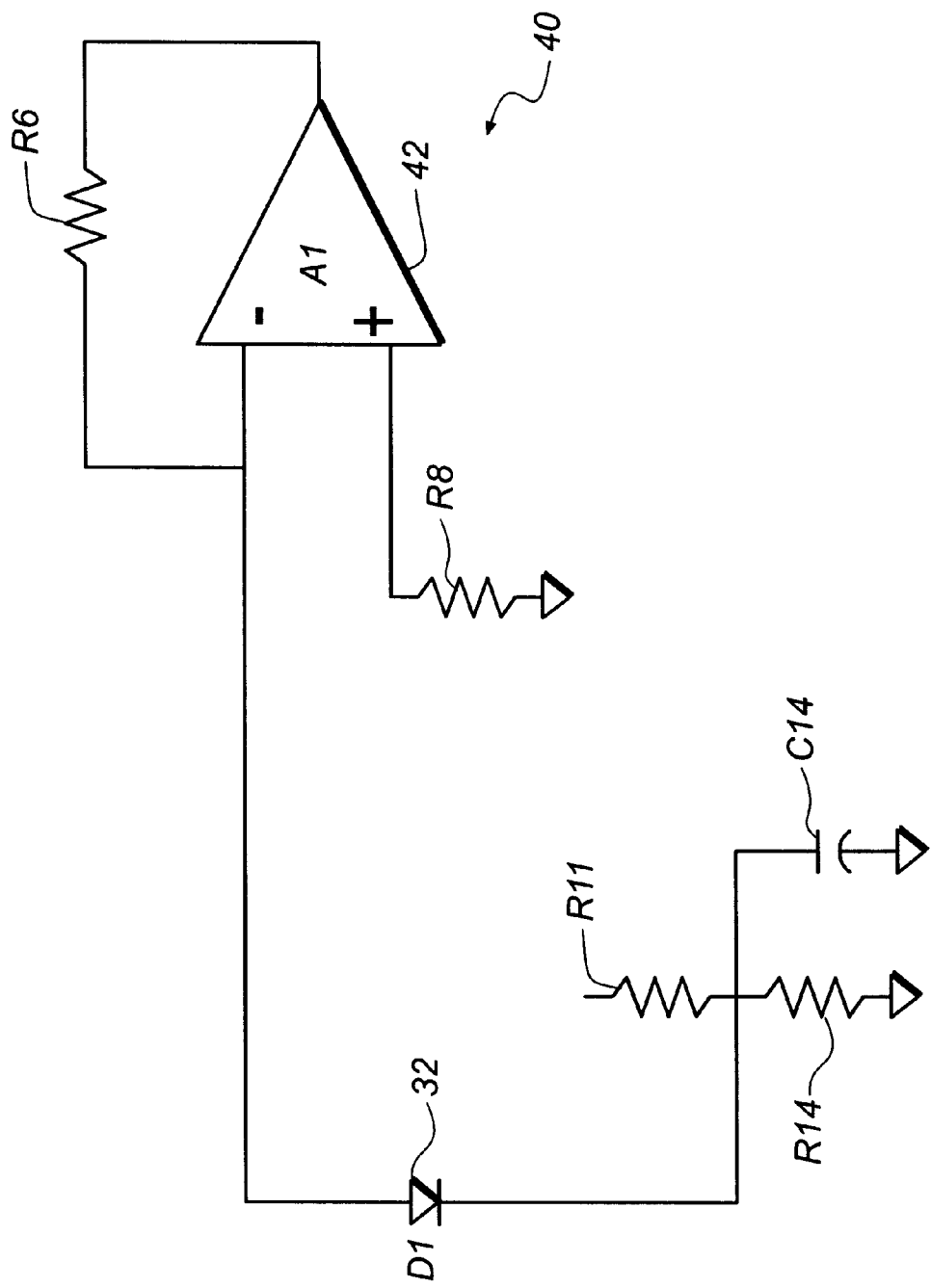
FIG. 2 is a schematic diagram of an electrical circuit for detecting a light beam in a prior art device.

Referring to FIG. 2, there is illustrated a circuit 40 provided in a controller made in accordance with the prior art. In particular, the circuit 40 includes photodetector 32. When a light beam transgresses the detector 32, a current in proportion to the intensity beam is generated. This current is then converted to a voltage by impedance amplifier 42 and the output is forwarded to a monitoring circuit (not shown) in controller 31 for controlling the line start of the scanning light beam. Appropriate resistors, R6 and R8, are provided along with capacitor C14 for biasing and bypassing D1.

Figure 3:
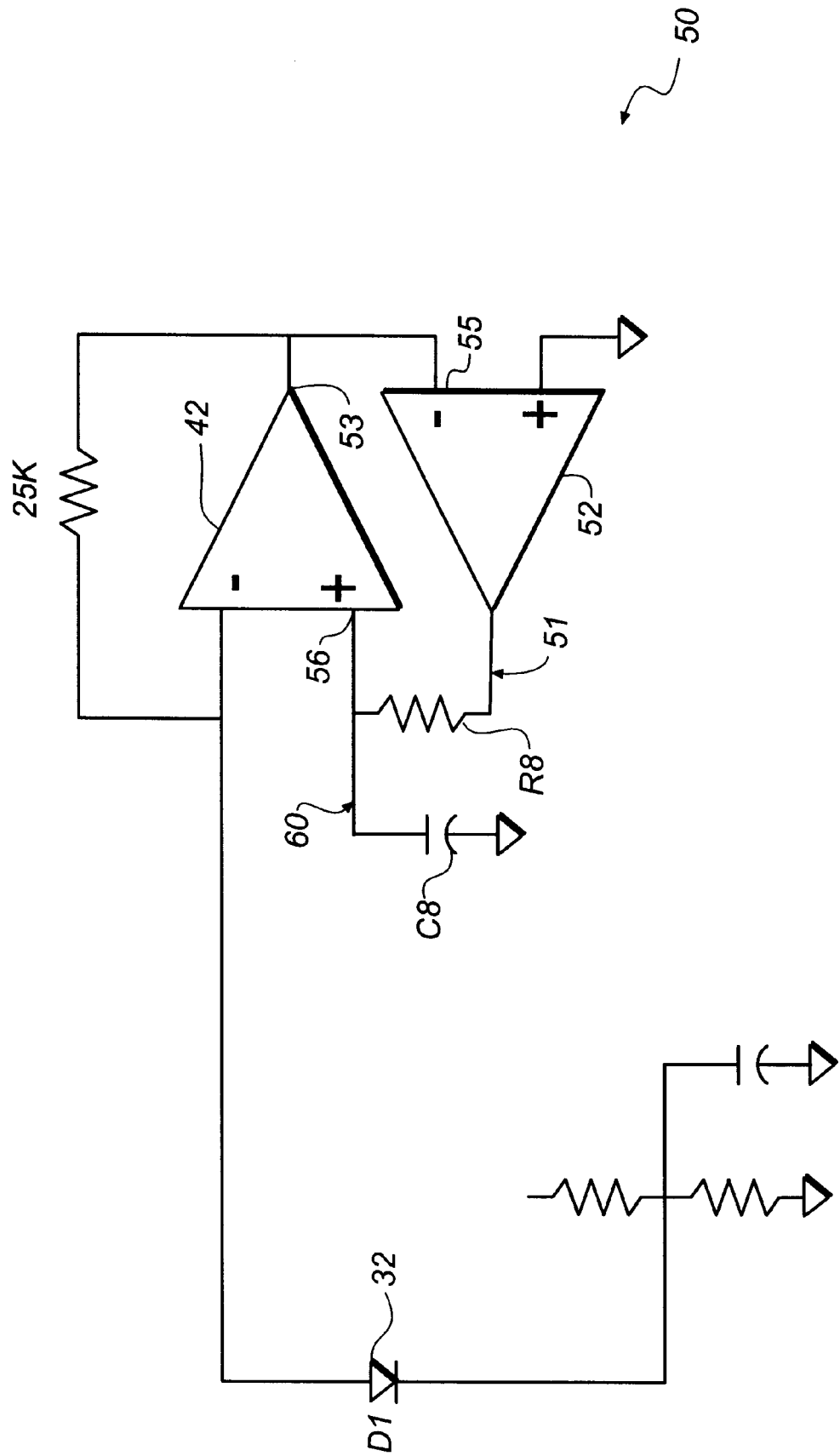
FIG. 3 is an electrical diagram of a photodetection circuit made in accordance with the present invention.

Referring to FIG. 3, there is illustrated a photodetection circuit 50 provided in controller 31 made in accordance with the present invention, like numerals indicating like parts as previously discussed. As can be seen, a feedback loop 51 to transimpedance amplifier 42 is provided. The feedback loop 51 comprises an amplifier 52, which has a negative input 55 connected to the output 53 of transimpedance amplifier 42. The output of the feedback amplifier 52 is provided to the positive input 56 of the transimpedance amplifier 42. The amplifier 52 results in a correction voltage being generated, which will force the output of impedance amplifier 42 to be at the positive input voltage of amplifier 52. In the particular embodiment illustrated, the predetermined positive input voltage is zero (shown as a ground connection). However, it is to be understood that the predetermined voltage may be any value desired. Thus, no matter how much dark current, or any other on one current, exists when the detector 32 is idle or not detecting light beam 16, the output of the amplifier 42 will remain at the desired voltage. As the scanning light beam 16 moves across the detector 32, the current increases and the output of amplifier 42 will decrease below zero since it is configured as an inverting amplifier. Because of the feedback loop 51, the amplifier 52 will immediately attempt to impede the output of amplifier 42 at zero volts. To overcome this problem, a time delay circuit 60 consisting of resistors R8 and C8 is provided. The values of the time delay circuit 54 are selected so that the current pulse would be amplified and would be long gone before correction from amplifier 52 would be applied to amplifier 42. In other words, the pulse from the detector 32 would be amplified as normal, while the long term output remains at zero volts. Preferably, the response time of amplifier 52 is in the range of about 100 to 15,000 times slower than that of the detector output. Therefore, the feedback is providing a long term correction to the circuit 50. The time delay circuit 60 is long enough to allow the output signal to be generated without any distortion. In the particular embodiment illustrated, the time response of the time delay circuit is approximately 14,000 times slower than the output of the photodiode.

Figure 4:
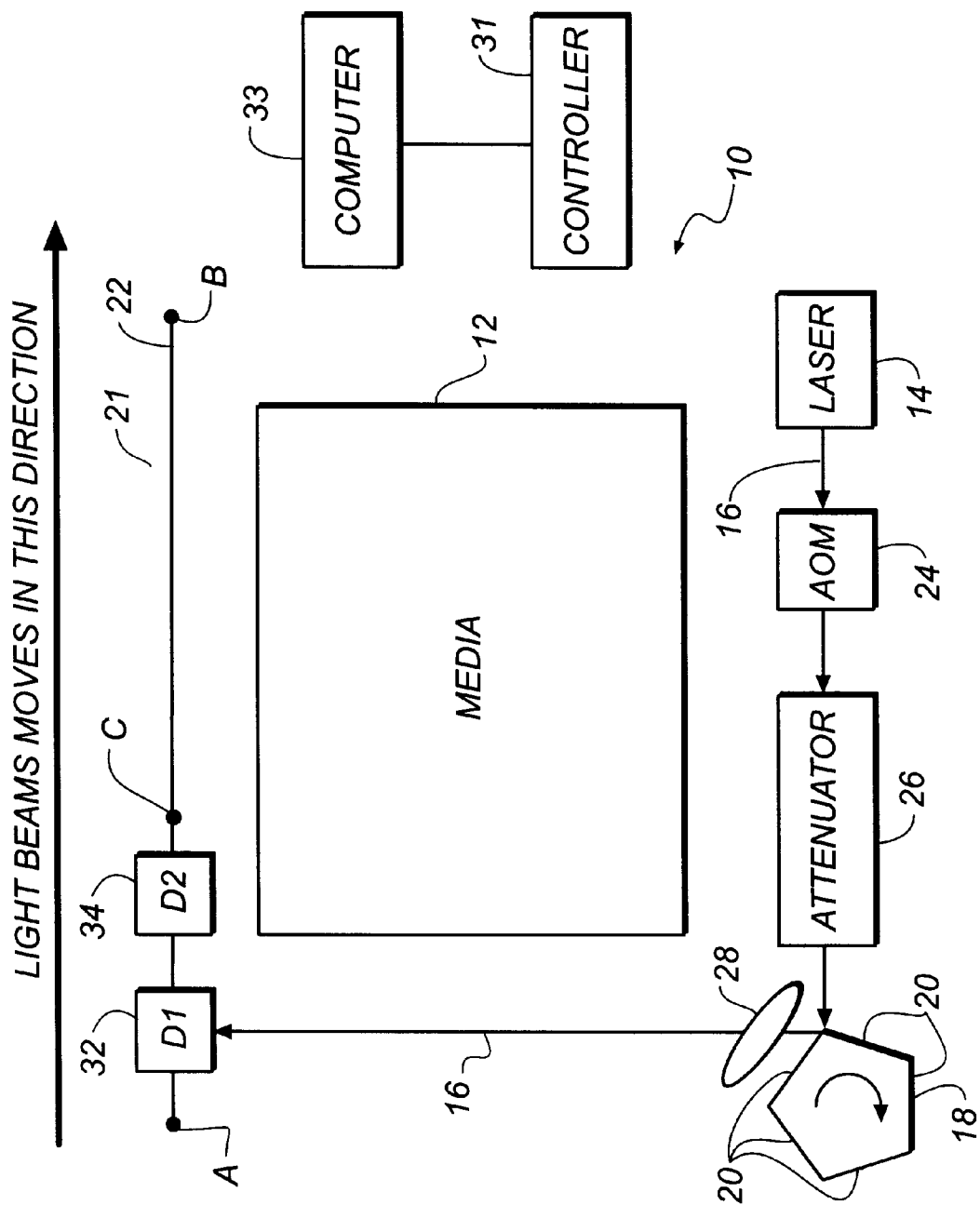
FIG. 4 is a schematic illustration of a modified scanning writing apparatus made in accordance with the present invention.

Referring to FIG. 4, there is illustrated an embodiment wherein two detectors are used for detecting of the line start position, like numerals indicating like parts as previously discussed. In this embodiment, a second detector 34 is provided. The line start signal is determined in response to a particular relationship to the output of the voltages of the detectors 32,34 as discussed in greater detail in copending application Ser. No. 09/218,508, entitled "Method and Apparatus for Writing onto a Media Using a Scanning Light Beam," by Jon Hoeft, filed concurrently herewith, [Attorney Docket No. 77669/F-P], the subject matter of which is hereby incorporated by reference.

Figure 5:
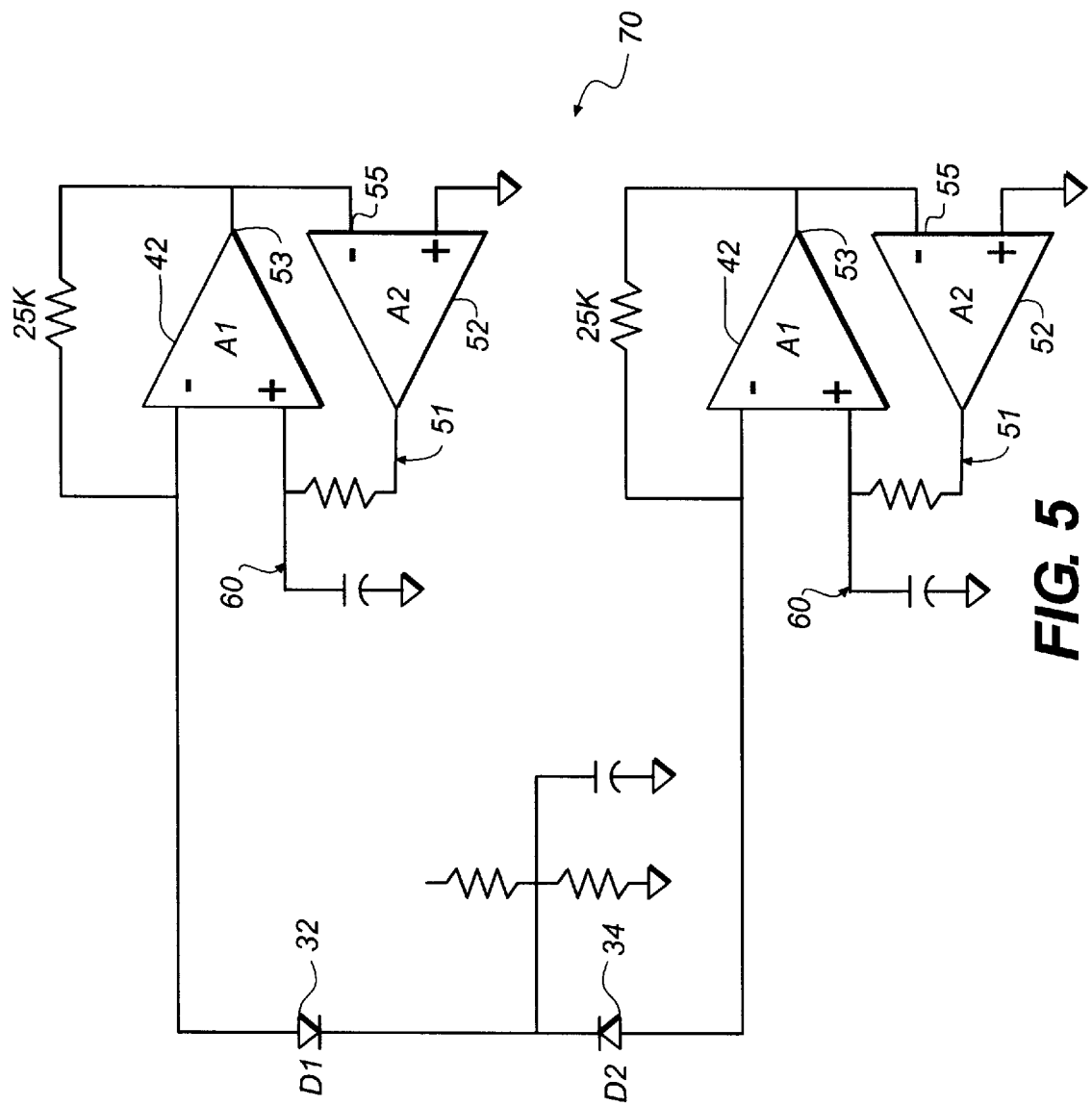
FIG. 5 is an electrical diagram of a modified photodetection circuit made in accordance with the present invention.

Referring to FIG. 5, there is illustrated a modified photodetection circuit 70 made in accordance with the present invention for use in the embodiment illustrated in FIG. 4. In this embodiment, the second circuit 40 is provided for compensating of a second detector 34, like numerals indicating like parts and operation as previously discussed. As can be seen, each of the two circuits continue to operate in the same manner previously discussed.

The invention has been described in detail with particular reference to certain preferred embodiments thereof, but it will be understood that variations and modifications can be effected within the scope of the invention.

What is claimed is:

1. A scanning apparatus having a scanning light beam which moves along a scan path for writing onto a media, comprising:
   a detector disposed in said scan path;
   a first amplifier having a negative input, a positive input and an output, the output of the detector being connected to the negative input of said first amplifier;
   a second amplifier having a negative input, a positive input and an output, the output of said second amplifier being connected to the positive input of said first amplifier, said second amplifier providing an output to said first amplifier such that said first amplifier is forced to a predetermined value when no signal is being produced by the photo diode; and
   a time delay circuit provided between the output of said second amplifier and the positive input of said first amplifier for delaying the signal from said second amplifier to said positive input of said first amplifier.

2. A scanning apparatus according to claim 1 wherein said time delay circuit comprises a capacitor and a resistor designed such that a signal produced by the detector will be passed through the first amplifier long before the response of the second amplifier can take effect.

3. A scanning apparatus according to claim 2 wherein the response time of said second amplifier is in the range of about 100 to 15,000 times slower than that of said detector output.

4. A scanning apparatus according to claim 1 wherein the positive input of said second amplifier is at a predetermined value so as to shift the output of said first amplifier to a desired value.

5. A scanning apparatus according to claim 1 wherein said detector is a photodiode.

6. A scanning apparatus according to claim 1 further comprising:
   a second detector;
   a third amplifier having a negative input, a positive input and an output, the output of the second detector being connected to the negative input of said third amplifier;
   a fourth amplifier having a negative input, a positive input and an output, the output of said fourth amplifier being connected to the positive input of said third amplifier; and
   a second time delay circuit provided between the output of said fourth amplifier and the positive input of said third amplifier for delaying the signal from said fourth amplifier to said positive input of said first amplifier.

7. A method for monitoring when a scanning light beam crosses a predetermined point in a scan path, said monitoring circuit comprising a detector placed in the path of the scanning beam at a predetermined point and an amplifier having a negative input, a positive input and an output, the output of the detector being connected to the negative input, comprising the step of:
   providing a feedback loop to said amplifier such that the output of the amplifier is forced to a predetermined value when no signal is being produced by the photodiode.

8. A method according to claim 7 wherein said feedback loop comprises providing a second amplifier which provides an output to the input of the first amplifier.

9. A method according to claim 8 wherein said second amplifier forces the output of the first amplifier to be substantially zero when no signal is present.

10. A method according to claim 7 wherein said detector comprises a photodiode.

* * * * *